Oct. 13, 1970  J. N. IANUZZI ET AL  3,533,864
METHOD OF MAKING LAMINATED THREE-DIMENSIONAL
MOLDED WOOD ARTICLES
Filed March 21, 1967

INVENTORS
Joseph N. Ianuzzi &
Robert P. Habgood, Jr.

United States Patent Office 3,533,864
Patented Oct. 13, 1970

3,533,864
METHOD OF MAKING LAMINATED THREE-DIMENSIONAL MOLDED WOOD ARTICLES
Joseph N. Ianuzzi and Robert P. Habgood, Jr., Bradford, Pa., assignors to Plexowood, Inc.
Filed Mar. 21, 1967, Ser. No. 624,776
Int. Cl. B29j 5/04
U.S. Cl. 156—62.2                    5 Claims

ABSTRACT OF THE DISCLOSURE

This invention provides a three-dimensional molded wood article having a core of molded finely divided wood and resin, a substantially uniform number of layers of thermoplastic resin impregnated paper on each side of the core, a patterned paper on the surface of the assembly to be exposed and an outer layer of thermoset finish resin covering said patterned paper and bonding it to said thermoplastic impregnated paper. The method generally includes the steps of forming a core of finely divided wood and resin in a mold under heat and pressure, applying a substantially equal number of sheets of thermoset resin impregnated paper on all sides of said core to substantially equal the dimensional change of the core resulting from shrinkage following forming and applying heat and pressure to fuse the impregnated paper to said surfaces.

---

This invention relates to three-dimensional molded wood articles and methods of making the same and particularly to a two-stage process for forming such articles in a manner which eliminates the problems raised by shrinkage of the core.

Two-stage processes for forming molded wood products are not of themselves new. However, such two-stage processes have several deficiencies which have militated against their general adoption where a resin coating such as a melamine resin is applied in the second step. In such processes it is important that the pressure be uniform on all surfaces in the second step which includes applying the finish layer of resin. If the pressure is not uniformly at the proper pressure, those areas which have too low a pressure become milky, whereas those areas where the pressure is too great become distorted on the surface. In either event, the produce is unsatisfactory. In two-stage processes, however, there is always some shrinkage of the molded wood chip core as it comes from the first step molding. It is this shrinkage which creates problems in the manufacture of finish coated products by the two-stage process because of its non-uniformity and the resultant defective surfaces.

We have solved the problems of surface defects in two-stage processing of molded wood articles. We have discovered a process and finished article which eliminates the problems of shrinkage in the core and provides a uniformly perfect surface on the finished article.

In a preferred practice of our invention we form a core of predominantly wood chips with a resin adhesive and pressure and elevated temperature, laminate the thus formed core between at least one layer on each side of a core stock resin capable of flowing at the temperature and pressure of molding, placing a patterned sheet on one surface, overlaying the patterned sheet with a clear thermoset resin, a silicone sheet and a cushion sheet and applying pressure at elevated temperature to cause the core stock resin to fuse and flow and the finish resin to fuse and penetrate the patterned sheet. Preferably, we use a phenolic resin impregnated paper sheet for the core stock and a melamine impregnated thin paper sheet for the finish resin. Preferably, the cushion sheet is a sheet of kraft paper.

In the foregoing general description of our invention we have set out certain objects, purposes and advantages. Other objects, purposes and advantages will become apparent from a consideration of the following description and the accompanying drawings in which.

Figure 1:
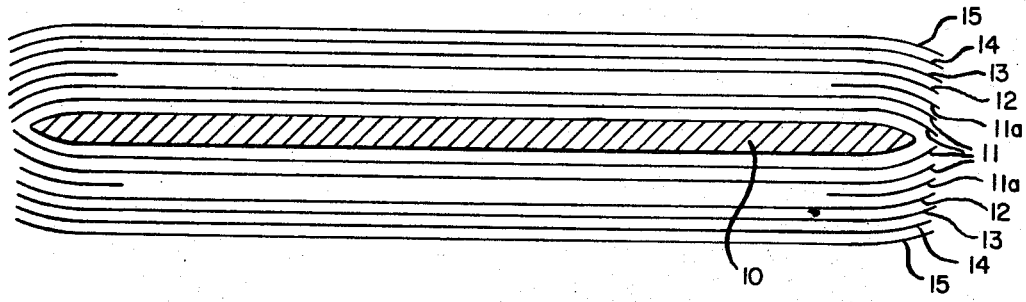
FIG. 1 is an exploded cross-sectional view of an assembly for forming a table top according to our invention.
Figure 2:
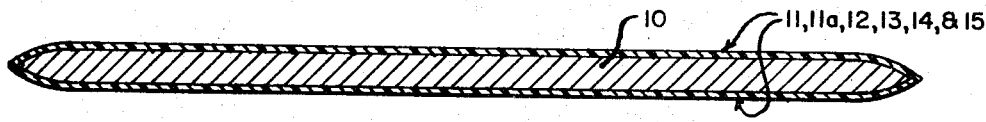
FIG. 2 is a cross-section through a finished table top according to our invention.

Referring to the drawings, we have illustrated a core 10 formed of wood chips and a minor proportion of resin under pressure and elevated temperature. The core 10 is placed between an equal number of phenolic resin impregnated sheets 11.

If certain areas have greater shrinkage than others, small pieces of phenolic resin impregnated sheets 11a are used in those areas. The top surface is then overlaid with a patterned sheet 12 of paper and a finish sheet 13 of thin paper impregnated with melamine resin, a parting sheet of silicone paper 14 is placed on top and finally a cushion sheet 15 of kraft paper. The foregoing assembly is placed in a mold 16 and the mold closed under pressure and steam is passed through the mold to cure the assembly. The finished article has a smooth clear finish free of whiteness or distortion.

We have found that the top and bottom additions of phenolic impregnated sheet 11 (core stock) must be substantially identical in order to avoid walking and bending of the finished article. By our practice the surface distortion and whiteness which were common defects in prior art wood molding techniques are eliminated along with warping and bending of the finished article.

While we have illustrated and described a presently preferred practice and embodiment of our invention in the foregoing specification, it will be understood that the invention may be otherwise embodied within the scope of the following claims.

We claim:
1. The method of forming dimensioned wood articles comprising the steps of forming a core of finely divided wood and resin in a mold under heat and pressure, placing a substantially equal number of sheets of thermoset resin impregnated paper on all sides of said core to substantially equal the dimensional change of the core resulting from shrinkage following forming and applying heat and pressure to fuse the impregnated paper to said surfaces.

2. The method as claimed in claim 1 wherein the thermoset resin impregnated paper is impregnated with a phenolic resin.

3. The method as claimed in claim 1 including placing on the exposed surface of the thermoset resin paper on a side of the core to be ornamented, a patterned paper and then a thermoplastic resin impregnated clear finish sheet prior to applying heat and pressure.

4. The method as claimed in claim 1 wherein a parting sheet of silicone impregnated paper is placed on the thermoset resin impregnated paper and a cushion sheet of relatively coarse paper is placed on the silicone impregnated paper prior to applying heat and pressure.

5. The method as claimed in claim 1 wherein a patterned paper is placed over all surfaces and the patterned paper is successively overlaid by a sheet of thermoset plastic, then a parting sheet of silicone impregnated paper and finally a cushion sheet of relatively coarse paper prior to applying heat and pressure.

References Cited
UNITED STATES PATENTS

| | | | |
|---|---|---|---|
| 2,200,650 | 5/1940 | Welch | 156—245 |
| 2,592,470 | 4/1952 | Ryberg | 156—245 X |

CARL D. QUARFORTH, Primary Examiner

S. J. LECHERT, Jr., Assistant Examiner

U.S. Cl. X.R.

156—85, 242, 245; 161—268

UNITED STATES PATENT OFFICE
CERTIFICATE OF CORRECTION

Patent No. 3,533,864                                October 13, 1970

Joseph N. Ianuzzi et al.

It is certified that error appears in the above identified patent and that said Letters Patent are hereby corrected as shown below:

Column 1, line 46, "produce" should read -- product --.
Column 2, line 37, "walking" should read -- warping --.

Signed and sealed this 6th day of April 1971.

(SEAL)
Attest:

EDWARD M. FLETCHER, JR.
Attesting Officer

WILLIAM E. SCHUYLER, JR.
Commissioner of Patents